W. W. BROWN.
MECHANICAL MOVEMENT.
APPLICATION FILED MAR. 12, 1914.
1,127,398.
Patented Feb. 9, 1915.
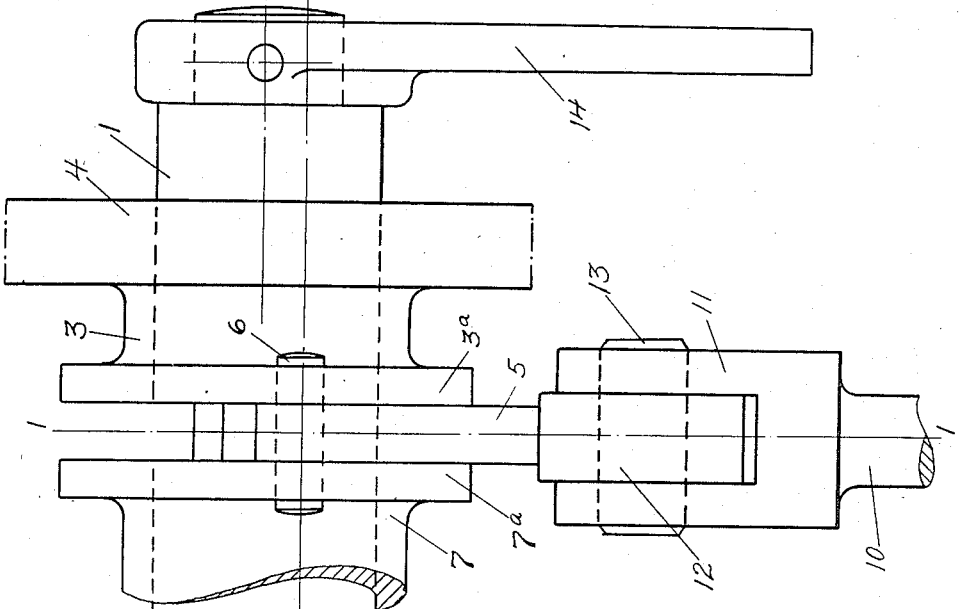
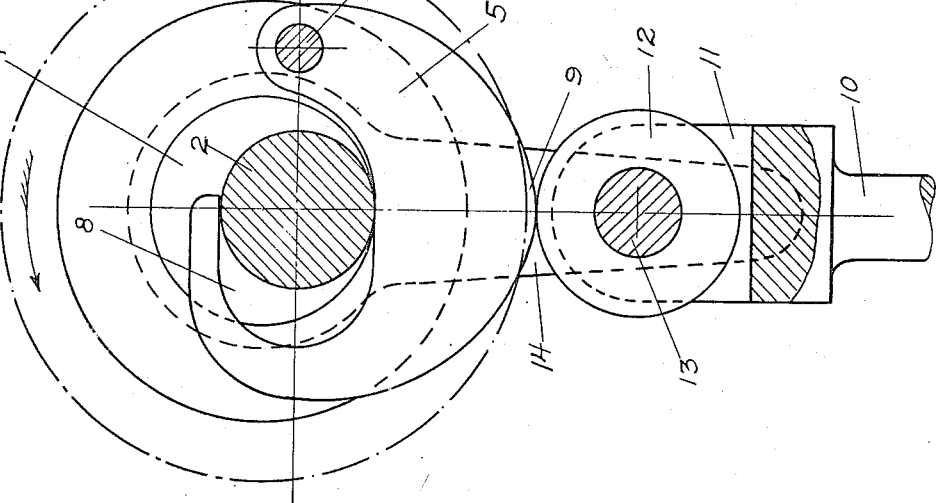
Witnesses
B. M. Hartman
V. C. Free
Inventor
Walter W. Brown
By W. R. Lind
Attorney

UNITED STATES PATENT OFFICE.

WALTER W. BROWN, OF ERIE, PENNSYLVANIA.

MECHANICAL MOVEMENT.

1,127,398. Specification of Letters Patent. Patented Feb. 9, 1915.

Application filed March 12, 1914. Serial No. 824,145.

*To all whom it may concern:*

Be it known that I, WALTER W. BROWN, a citizen of the United States, residing at Erie, in the county of Erie and State of Pennsylvania, have invented new and useful Improvements in Mechanical Movements, of which the following is a specification.

This invention relates to a mechanical movement and consists in certain improvements in the construction thereof as will be hereinafter fully described and pointed out in the claims.

The mechanical movement is designed to impart a reciprocating movement to some mechanism such as a feed pump for an explosive engine with devices for adjusting the throw of the mechanism.

The invention is illustrated in the accompanying drawings as follows:—

Figure 1 shows a section on the line 1—1 in Fig. 2. Fig 2 an elevation of the mechanism.

1 marks a crank shaft on which is arranged a crank 2. Ordinarily this crank is formed by a reduction in the diameter of the shaft, the reduced portion being eccentric to the shaft proper. The carrier 3 is rotatively mounted on the shaft 1 and this carrier is driven by a gear or other driving device 4.

An actuator 5 in the form of a cam is pivoted on the pin 6, the pin 6 being eccentric to the axis of the carrier 3 and shaft 1. The pin is secured to the carrier 3 so that the actuator 5 is rotatively driven with the carrier 3. Preferably a sleeve 7 is arranged opposite the carrier 3 and the pin 6 extends into the sleeve 7, the sleeve being driven with the carrier. The actuator 5 has the slot 8, the sides of which are engaged by the crank 2. The actuator has the cam surface 9 and this surface normally protrudes from the periphery of the flanges $3^a$ of the carrier and $7^a$ of the sleeve 7 respectively.

The mechanism to be actuated is connected by the stem 10 which may be attached to any device in which a reciprocating movement is desired. The stem 10 terminates in a fork 11 in which a roller 12 is mounted, the roller being journaled on the pin 13 extending between the arms of the fork 11.

It will be readily observed that with the mechanism shown that as the carrier 3 is rotated, the roller is forced away from the axis of the carrier by the action of the actuator 5, the cam surface 9 of said actuator extending beyond the peripheries $3^a$ and $7^a$. As the roller passes off the cam 9 it rides on the surfaces $3^a$ and $7^a$.

In order to adjust the throw of the actuator it is necessary to turn the shaft 1. The arm 14 is provided for this purpose. By swinging the arm 14, the position of the crank 2 may be varied. Thus, if the shaft 1 is turned one-half a revolution so as to bring the crank 2 at the top or opposite side from the roller 12 the actuator 5 will be lifted so as to bring the cam 9 without the peripheries $7^a$ and $3^a$ at the top instead of the bottom there will be no movement given to the stem 10. By giving the crank positions intermediate this extreme throw, any throw within the limits of the crank 2 may be given to the stem 10 according to whether the extreme outward position of the cam 9 is at the point of contact with the roller 12 or at some other point in its travel.

What I claim as new is:—

1. In a mechanical movement, the combination of an actuator having a slot therein; a carrier on which the actuator is pivotally mounted, the pivot being eccentric to the axis of the carrier; a crank operating in the slot of the actuator; and means for adjusting the crank relatively to the carrier to vary the throw of the actuator.

2. In a mechanical movement, the combination of an actuator having a slot therein, said actuator having a cam surface thereon; a carrier on which the actuator is pivotally mounted, the pivot being eccentric to the axis of the carrier; a crank operating in the slot in the actuator; and means for adjusting the crank relatively to the carrier to vary the throw of the actuator.

3. In a mechanical movement, the combination of a crank shaft; a crank on said shaft; a carrier rotatively mounted on the crank shaft; an actuator pivotally mounted on the carrier and having a slot therein in which the crank operates; and means for adjusting the crank shaft relatively to the carrier to vary the throw of the actuator.

4. In a mechanical movement, the combination of a crank shaft; a crank on said shaft; a carrier rotatively mounted on the shaft and having a circular contact periphery; an actuator pivotally mounted on the carrier, the pivot being eccentric to the axis of the carrier, said actuator having a slot in which said crank operates and having a cam surface adapted to be thrown without the contact surface of the carrier; and means for adjusting the crank relatively to the carrier to vary the throw of the actuator.

5. In a mechanical movement, the combination of a crank shaft; a crank on said shaft; a carrier rotatively mounted on the shaft and having a flange thereon with a circular periphery; a sleeve opposite the carrier having a flange similar to the flange on the carrier; an actuator pivotally mounted between said flanges, the pivot being eccentric to the axis of the carrier, said actuator having a slot in which the crank operates and a cam surface adapted to be thrown without the peripheries of the flanges; and means for adjusting the crank shaft relatively to the carrier to vary the throw of the actuator.

6. In a mechanical movement, the combination of a normally stationary crank; a carrier rotating about the crank; and an actuator rotated by the carrier and having its radial position controlled by the crank.

7. In a mechanical movement, the combination of a normally stationary crank; a carrier rotating about the crank; an actuator rotated by the carrier and having its radial position controlled by the crank; and means for adjusting the crank to vary the throw of the actuator.

8. In a mechanical movement, the combination of a normally stationary crank; a carrier rotating about the crank; and an actuator rotated by the carrier and having its radial position controlled by the crank, said actuator having a cam surface thereon.

In testimony whereof I have hereunto set my hand in the presence of two subscribing witnesses.

WALTER W. BROWN.

Witnesses:
B. M. HARTMAN,
H. C. LORD.